US012665265B2

(12) United States Patent
Goetz et al.

(10) Patent No.: US 12,665,265 B2
(45) Date of Patent: Jun. 23, 2026

(54) APPARATUS FOR MAGNETIC FLUX GENERATION ON BUSBARS OF A RECONFIGURABLE BATTERY

(71) Applicant: Dr. Ing. h.c. F. Porsche Aktiengesellschaft, Stuttgart (DE)

(72) Inventors: Stefan Goetz, Forstern (DE); Korbinian Goetz, Forstern (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 554 days.

(21) Appl. No.: 18/317,106

(22) Filed: May 15, 2023

(65) Prior Publication Data

US 2023/0378619 A1 Nov. 23, 2023

(30) Foreign Application Priority Data

May 20, 2022 (DE) .......................... 102022112691.9

(51) Int. Cl.
*H01M 50/517* (2021.01)
*H01M 50/507* (2021.01)
(Continued)

(52) U.S. Cl.
CPC ....... *H01M 50/517* (2021.01); *H01M 50/507* (2021.01); *H02J 7/50* (2026.01); *H02J 7/70* (2026.01)

(58) Field of Classification Search
CPC .. H01M 50/517; H01M 50/507; H02J 7/0013; H02J 7/0042
See application file for complete search history.

(56) References Cited

U.S. PATENT DOCUMENTS 6,288,915 B1 * 9/2001 Stemmler ............... H02M 1/12
363/48
2013/0200849 A1 * 8/2013 Crebier ................. H02J 7/0042
320/116
(Continued)

FOREIGN PATENT DOCUMENTS

DE 19757452 A1 6/1999
DE 102014217526 A1 3/2016
(Continued)

OTHER PUBLICATIONS

Stefan M. Goetz, et al., "Modular Multilevel Converter With Series and Parallel Module Connectivity: Topology and Control", p. IEEE Transactions on Power Electronics, Jan. 2015, pp. 203-215, vol. 30, Is. No. 1, doi:10.1109/TPEL.2014.2310225.

*Primary Examiner* — Alexander Usyatinsky
(74) *Attorney, Agent, or Firm* — LEYDIG, VOIT & MAYER, LTD.

(57) ABSTRACT

An apparatus for magnetic flux generation on two parallel extending busbars, the apparatus including two clasps that are connected or are to be connected to one another, which are formed from a magnetic material. A respective clasp of the two clasps includes at its two ends a respective connection region for contacting the respective other clasp of the two clasps. When the two clasps are connected to one another, a central region of the respective clasp has a specified spacing from the central region of the respective other clasp. The respective clasp is formed such that, if the respective clasp is inserted perpendicular to and between the parallel extending busbars, a first part of the respective clasp extends below one of the two busbars and a second part of the respective clasp extends above another of the two busbars.

11 Claims, 10 Drawing Sheets

(51) Int. Cl.
　　　*H02J 7/50*　　　　　　(2026.01)
　　　*H02J 7/70*　　　　　　(2026.01)

(56)　　　　　　　References Cited

U.S. PATENT DOCUMENTS

2020/0083515 A1 *　3/2020　Lejosne ............... H01M 50/262
2021/0001733 A1 *　1/2021　Meins ..................... B60L 53/12
2021/0366642 A1 *　11/2021　Herrmann ............... H01F 17/06

FOREIGN PATENT DOCUMENTS

DE　　102018215576 A1　　3/2020
EP　　　　2097970 B1　　10/2018
EP　　　　3624231 A1 *　3/2020　.......... H01M 50/522

* cited by examiner

APPARATUS FOR MAGNETIC FLUX GENERATION ON BUSBARS OF A RECONFIGURABLE BATTERY

CROSS REFERENCE TO RELATED APPLICATIONS

This application claims benefit to German Patent Application No. DE 10 2022 112 691.9, filed on May 20, 2022, which is hereby incorporated by reference herein.

FIELD

The present invention relates to an apparatus that can be clamped together for magnetic flux generation on busbars of a reconfigurable battery for suppressing current ripples. Further, the present invention relates to a method for magnetic flux generation on busbars by means of the apparatus.

BACKGROUND

Reconfigurable batteries or modular multilevel converters with a parallel connection state, e.g. described in "Goetz, S. M.; Peterchev, A. V.; Weyh, T., "Modular Multilevel Converter With Series and Parallel Module Connectivity: Topology and Control," Power Electronics, IEEE Transactions on, vol. 30, no. 1, pp. 203, 215, 2015. doi: 10.1109/TPEL.2014.2310225" generate voltage differences between two connection terminals, for example a power grid or a traction system of an electric car, by a configuration of an electrical circuit of energy reservoirs in modules, and by a switching modulation between switching states for forming intermediate states as desired. When dynamically switching into the parallel mode between two modules, however, there is a problem when the two module memories, e.g. capacitors or batteries, do not have the same voltage before switching into parallel mode. In this case, high equalizing currents can occur, which are primarily limited by the—mostly very small—impedance of the conductors, internal resistances of the transistors, and internal resistances of the capacitors or batteries. With a voltage difference of only one volt, e.g. 48 V in one module and 49 V in the adjacent module, with an impedance of 1 milliohm, equalizing currents of up to 1000 A occur, which flow until the charge differential is equalized. Numerous methods for equalizing the charge of modules in a modular multilevel converter are known from the prior art. However, even small remaining voltage differences lead to significant current surges, while further initial voltage differences could only be equalized in operation.

One possibility for reducing the high equalizing currents is to increase the connection impedance by incorporating resistors (which is ruled out due to the losses) or inductances. While the latter can significantly lower an amplitude of the equalizing current in the peak, the incorporation of inductances poses a significant problem for several reasons. For example, the inductances not only meet the equalizing currents in parallel mode, but also a load current in the serial and bypass mode, because it must flow through approximately N inductances in the case of a strand with N modules. Accordingly, these inductances can significantly reduce the maximum achievable dynamic and thus the frequency components that can be generated. Further, the inductances are in series to the load and, as voltage splitters, can thus limit the voltage effectively available at the output for the load to be powered. Furthermore, the installation of the discrete inductances has the disadvantage that connection points are required on both sides, in particular in the rated currents of several hundred amperes and the associated use of busbars in traction systems of electric vehicles. Components and related screw points become correspondingly large and unacceptably expensive. Lastly, the total load current must also be magnetic due to the inductance, which must be designed thermally and above all magnetically for this purpose. By definition, the inductance represents a magnetic field that scales with the current, which must be conducted accordingly and must be suitable for the space. Because typical magnetic materials have a magnetic saturation with respect to the flux density and thus the energy density of the magnetic field, a large amount of magnetic material must be used in order to avoid saturation by the load current. By contrast, only a fraction of the magnetic material would be necessary for a dampening of the equalizing currents.

Document EP 2 097 970 B1 proposes the use of two electronically switched output alternating voltages with different waveforms in order to supply the phase of an inductive load. For this purpose, a differential mode apparatus made of an ordinary magnetic core can be used, on which two anti-parallel coils are abutted, to which the respective voltage is applied. During each complete modulation period, one of the voltages is kept constant and thus not switched.

A power converter according to DE 197 57 452 A 1 comprises in the DC link a transformer having two magnetically coupled windings, one of which is connected to the positive path, the other to the negative path, in order to magnetize the core of the transformer and suppress undesirable asymmetric current components flowing in the same direction in both windings. The desired symmetrical current components flowing in the one winding in one direction and in the second winding in the opposite direction are not to be influenced.

SUMMARY

In an embodiment, the present disclosure provides an apparatus for magnetic flux generation on two parallel extending busbars, the apparatus comprising two clasps that are connected or are to be connected to one another, which are formed from a magnetic material. A respective clasp of the two clasps comprises at its two ends a respective connection region for contacting the respective other clasp of the two clasps. When the two clasps are connected to one another, a central region of the respective clasp has a specified spacing from the central region of the respective other clasp. The respective clasp is formed such that, if the respective clasp is inserted perpendicular to and between the parallel extending busbars, a first part of the respective clasp extends below one of the two busbars and a second part of the respective clasp extends above another of the two busbars, whereby the entirety of the apparatus encloses the two busbars in a direction of a busbar path in the form of an eight by the clasps that are connected to one another after a successful insertion. Perpendicular to the busbar path, the two clasps have the specified spacing relative to one another in a respective center part.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
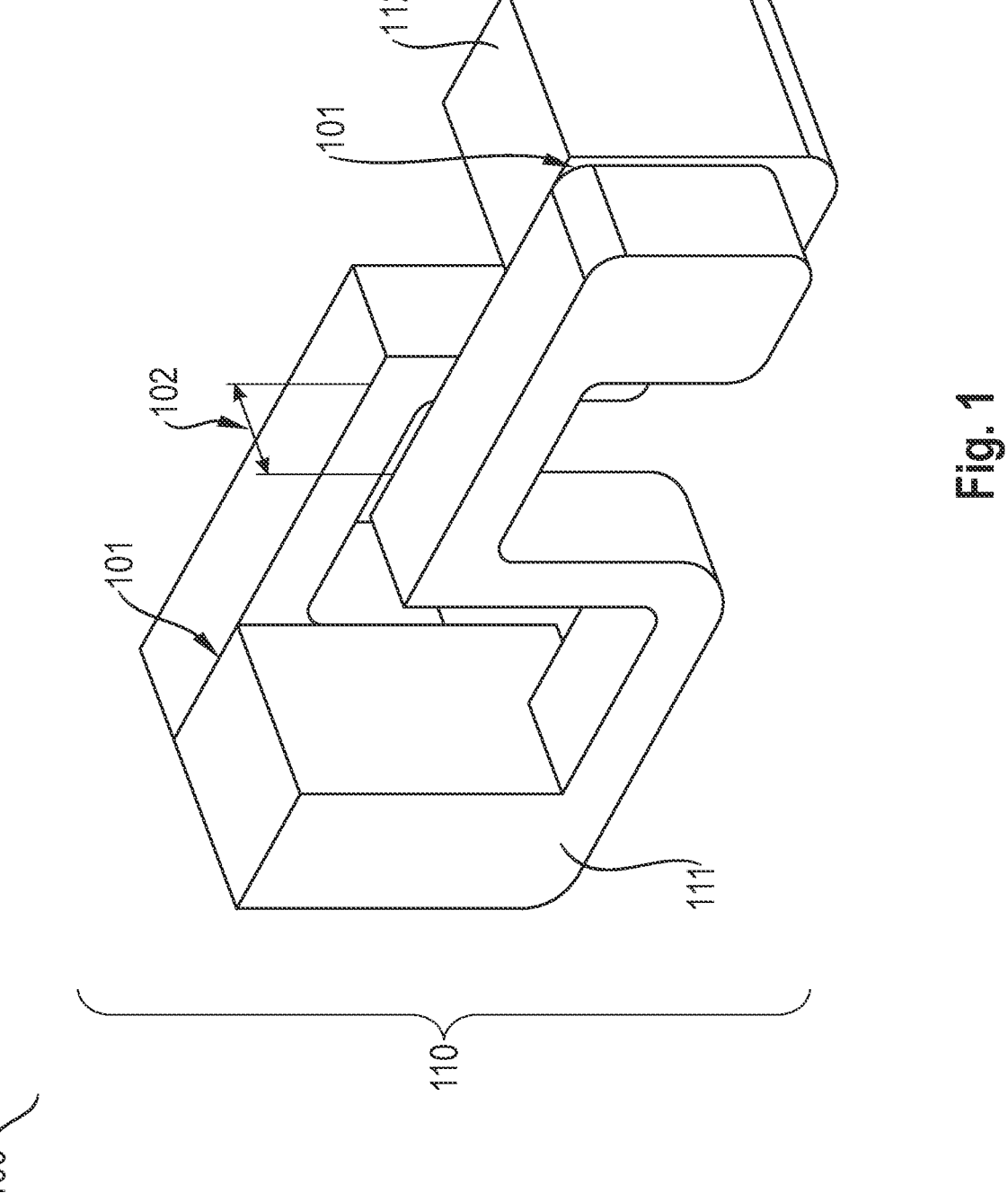
FIG. 1 shows a perspective view of a configuration of a battery cell according to an embodiment of invention.

In light of this background, embodiments of the present invention provide an apparatus for magnetic flux generation on busbars of a reconfigurable battery, which restricts an equalizing current occurring when switching battery modules into a parallel mode, but not a load current. The apparatus should in particular be able to be incorporated into an existing system without having to disengage and rearrange electrical terminals therein. Furthermore, embodiments of the present invention provide a method for magnetic flux generation on busbars by means of this apparatus.

To solve the aforementioned problem, an apparatus for magnetic flux generation is provided on two parallel extending busbars, wherein the apparatus comprises two clasps that are connected or to be connected to one another, which are formed from a magnetic material. A respective clasp comprises at its two ends a respective connection region for contacting the respective other clasp. When the clasps are connected to one another, a central region of the respective clasp has a specified spacing from the central region of the respective other clasp. A respective clasp is shaped in such a way that, in the case of a respective clasp inserted perpendicular to and between the parallel extending busbars, a first part of the respective clasp extends below one of the two busbars and a second part of the respective clasp extends above the other of the two busbars. Thus, the entirety of the apparatus encloses the two busbars in the direction of the busbar path in the form of an eight by means of the clasps that are connected to one another after the insertion. However, perpendicular to the busbar path, the two clasps have the specified spacing relative to one another in their respective center part. The spacing serves to avoid a scattering flow from the respective clasp through the air into the respective other clasp.

The apparatus according to an embodiment of the invention is not limited to busbars, but can instead be arranged on all types of live conductors, e.g. cables that are laid in parallel and currents having different flow directions. On two live busbars connected to respective battery poles or conductors, the apparatus according to an embodiment of the invention thus generates a counter-coupled inductance without influencing a respective current path itself. Instead, a magnetic field or a magnetic flux of the one live conductor is fed counterclockwise around the other conductor so that it can couple magnetically there and induce a counter-voltage, for example. In this way, in the magnetic material of the apparatus, currents flowing in the same direction, such as a load current generated by the battery modules, lead to opposite magnetic fields and thus to no magnetic net flux. On the other hand, currents flowing in different directions, such as equalizing currents between the energy reservoirs of the battery modules, produce magnetic fields that add up and cause an increased magnetic flux with high energy, which in turn dampens the currents underlying it.

For modular multilevel converters or reconfigurable batteries with a parallel switching option, switching between parallel mode and another mode, such as serial or bypass mode, between battery modules whose respective energy stores have different voltages will result in large equalizing currents. This problem is advantageously solved by the apparatus according to an embodiment of the invention, as it only generates an impedance for the equalization current and thus dampens a current equalization, but does not stress a load current flowing in the same direction in both busbars. By contrast to the solutions known from the prior art, this advantageously saves material, design space, costs, and a dynamic loss in the load current.

The two-part design of the apparatus with two clasps according to an embodiment of the invention also advantageously allows an assembly on an already joined reconfigurable battery in which the busbar bars are optionally fixedly connected to the respective terminals of the respective battery modules.

The apparatus according to an embodiment of the invention also advantageously leads to the suppression of a current ripple in the reconfigurable battery.

In one configuration of the apparatus according to an embodiment of the invention, the two clasps can contact one another by means of a plug connection, so that the connection region of a respective clasp comprises a plug pin at its one end and a plug opening at its other end.

In a further configuration of the apparatus according to an embodiment of the invention, the connection region of a respective clasp comprises at its one end a first contact surface and at its other end a second contact surface that can be connected to the first contact surface in a form-fit manner. A contact surface with as large a cross-sectional region as possible is advantageous in order to allow a large magnetic flux to flow from one clasp to the other without a high magnetic resistance, despite a transition on the contact surfaces of the two clasps. A remaining (air) gap or air pockets within the respective contact surface must be avoided, for example, because air is less magnetically conductive than magnetic material by a factor of 100 to over 1000.

In a continued further configuration of the apparatus according to an embodiment of the invention, the two clasps are fixedly connected to one another by way of adhesion of the first contact surface to the second contact surface or by respective clamps around the respective connection regions or by at least one frame surrounding both clasps.

In a further configuration of the apparatus according to an embodiment of the invention, the two clasps are identically shaped. They can also be connected to one another in a twisted manner relative to one another. Identically shaped clasps are also like parts, which are advantageously cheaper to produce.

In yet another configuration of the apparatus according to an embodiment of the invention, the respective clasp has an insulating upper layer outside the respective connection region. Assembly options can also be considered.

In a continued further configuration of the apparatus according to an embodiment of the invention, the respective clasp comprises two opposing bends in the shape of a letter "S" or only one bend in the shape of a letter "J".

In yet another continued configuration of the apparatus according to an embodiment of the invention, the magnetic material of the clasps is selected from materials with high permeability counts according to the following list: Ferrite, soft magnetic composite (SMC), nanocrystalline ferromagnetic alloys (e.g. $Fe_{74}CuNb_3Si_{15}B_7$), laminated steel sheets. However, materials made from iron, steel, and silicon steel, possibly sheet-plated, are also possible.

Furthermore, a method for magnetic flux generation in a reconfigurable battery having multiple battery modules is provided, wherein a respective battery module comprises at least one electrical terminal, on which two busbars are brought up to one another while extending parallel to one another. At one location of the two busbars, e.g. as close as possible to the at least one electrical terminal, an apparatus according to an embodiment of the invention is arranged. As a result, in the case of a high current flowing in the opposite direction in the respective busbars, a magnetic flux dampening this current is generated.

Furthermore, a reconfigurable battery having multiple battery modules is provided, wherein at least one pair of busbars brought up to a respective terminal of a respective battery module comprises at a respective location an apparatus according to an embodiment of the invention.

Additional advantages and configurations of embodiments of the invention result from the description and the enclosed drawings.

It goes without saying that the aforementioned features and the features yet to be explained in the following can be used not only in the respectively specified combination, but also in other combinations or on their own, without leaving the scope of the present invention.

The figures are described contiguously and comprehensively, and the same components are associated with the same reference numbers.

In FIG. 1, a perspective view 100 of a configuration of the apparatus 110 according to an embodiment of the invention is shown. The two clasps 111, 112 are connected to one another at their respective connection region 101, wherein a large-area configuration is advantageous. The two clasps 111, 112 are formed from a magnetic composite, which can be, for example, a ferrite, a soft-magnetic composite (SMC), laminated steel sheets, or a nanocrystalline alloy, such as e.g. $Fe_{74}CuNb_3Si_{15}B_7$. A contacting can occur by way of an adhesion or a peripheral clamping. A central region of the respective clasp 111 has a specified spacing 102 from the central region of the respective other clasp 112. With the spacing, it is avoided that, upon induction of a magnetic flux in the clasps 111, 112, a scattering flux is transmitted through the air between the clasps and the magnetic flux, as it were, seeks a "shortcut" instead of passing through the clasps 111, 112 of the apparatus 110 in its entirety and damping high equalizing currents according to the invention. A manufacture of the two clasp 111, 112 as identical parts is conceivable, wherein a first clasp 111 is twisted 180 degrees against a second clasp 112 with the axis of rotation extending perpendicular to the illustration when the apparatus 110 is assembled.

Figure 2:
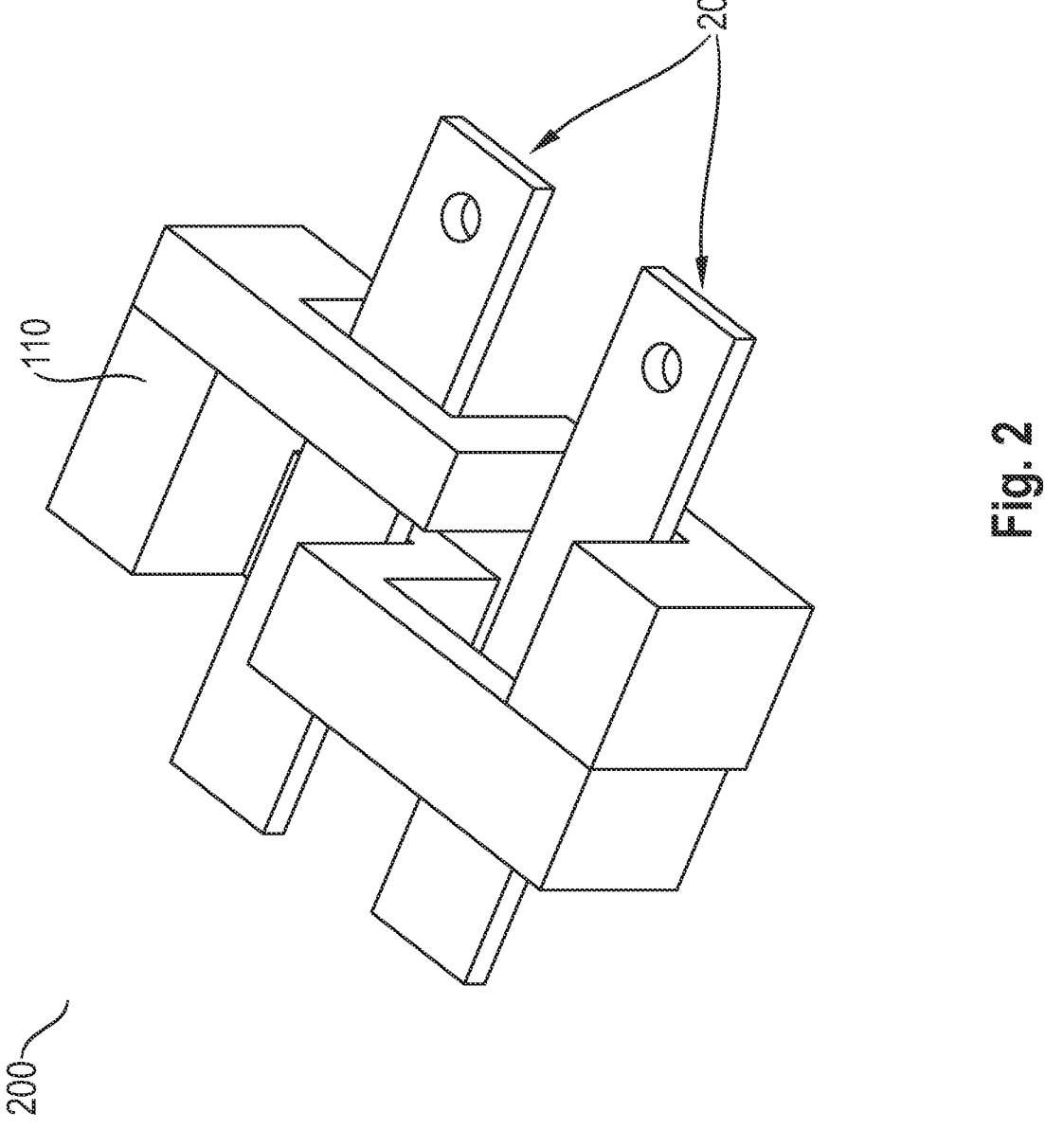
FIG. 2 shows a perspective view of a configuration of an apparatus according to an embodiment of the invention arranged on busbars.

In FIG. 2, a perspective view 200 of a configuration of the apparatus 110 according to an embodiment of the invention arranged on busbars 203 is shown. Both clasps of the apparatus 110 are shaped in such a way that, in the case of a respective clasp inserted perpendicular to and between the parallel extending busbars, a first part of the respective clasp extends below one of the two busbars 203 and a second part of the respective clasp extends above the other of the two busbars 203. As a result, the entirety of the apparatus 110 encloses the two busbars 203 in the direction of the busbar path in the form of an eight by means of the clasps that are connected to one another after the insertion. When the busbars 203 are not yet assembled on a terminal of a battery module, the two clasps of the apparatus 110 can be connected to one another in a first step and stuck onto the two busbars 203 in a second step. A manufacture as a one-piece apparatus is also conceivable.

Figure 3:
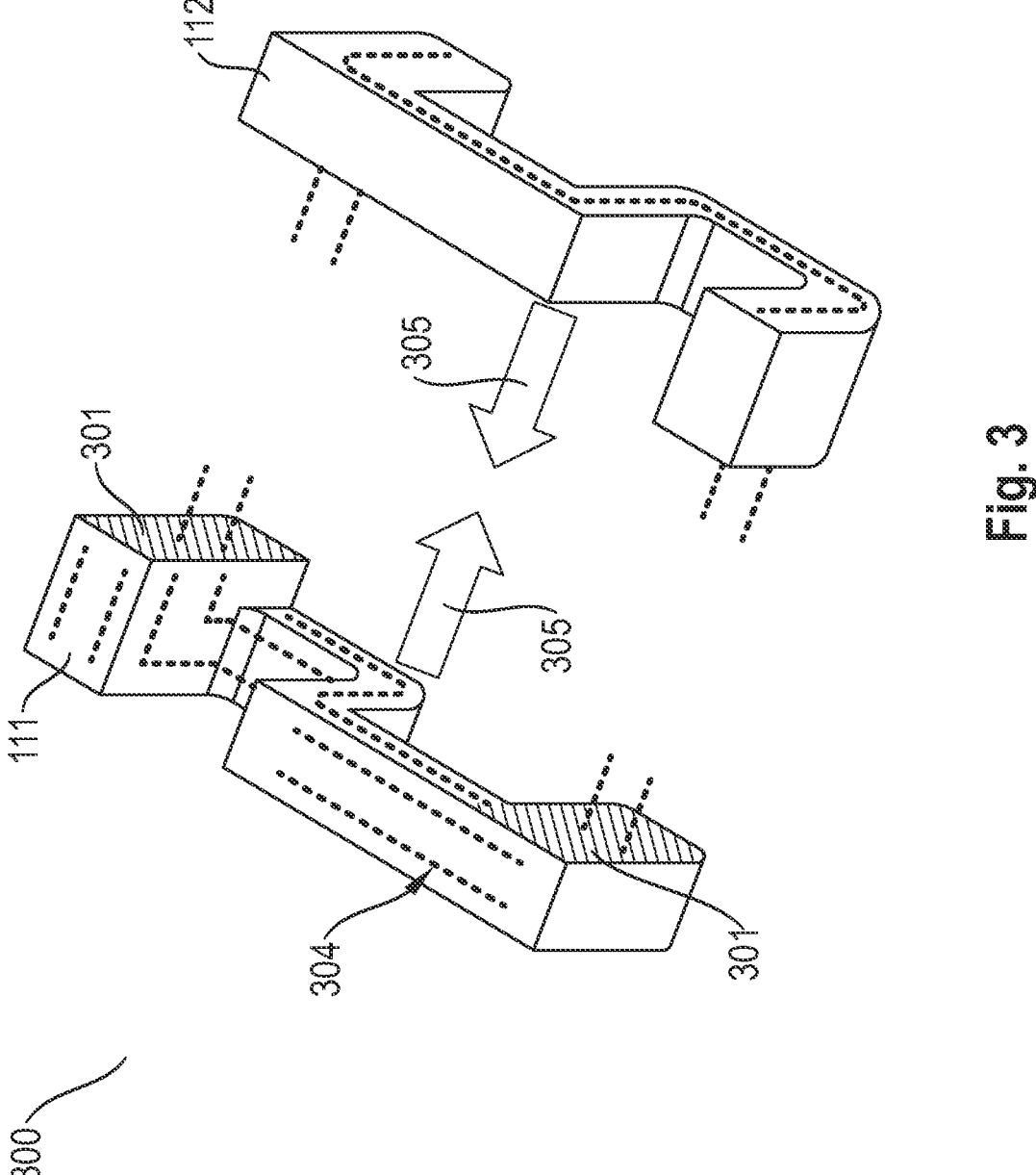
FIG. 3 shows a perspective view of a path of a magnetic flux for a configuration of the apparatus according to an embodiment of the invention.

In FIG. 3, a path of a magnetic flux 304 for a further configuration of the apparatus according to an embodiment of the invention, in which both clasps 111, 112 of the apparatus are identically configured, is depicted in the perspective view 300. To illustrate the path of the magnetic flux 304, the first clasp 111 and the second clasp 112, which is identical to the first clasp 111 but rotated by 180 degrees, are shown separately from one another with open contact surfaces 301, wherein they are assembled in the direction of arrows 305 so as to form the apparatus according to an embodiment of the invention. Only in this assembly—and in the arrangement of busbars shown in FIG. 2 with current flowing in the opposite direction in both busbars simultaneously—does the magnetic flux path 304 shown arise. A flow guide along the primarily elongated but bend-containing configuration of the clasps 111, 112 is pronounced such that the magnetic flux is passed below the one busbar and is then passed over the other busbar. The contact surfaces 301 are advantageously formed with a larger cross section than in the other path of the respective clasp 111, 112 in order to facilitate a transition of the magnetic flux between the two clasps 111, 112.

Figure 4:
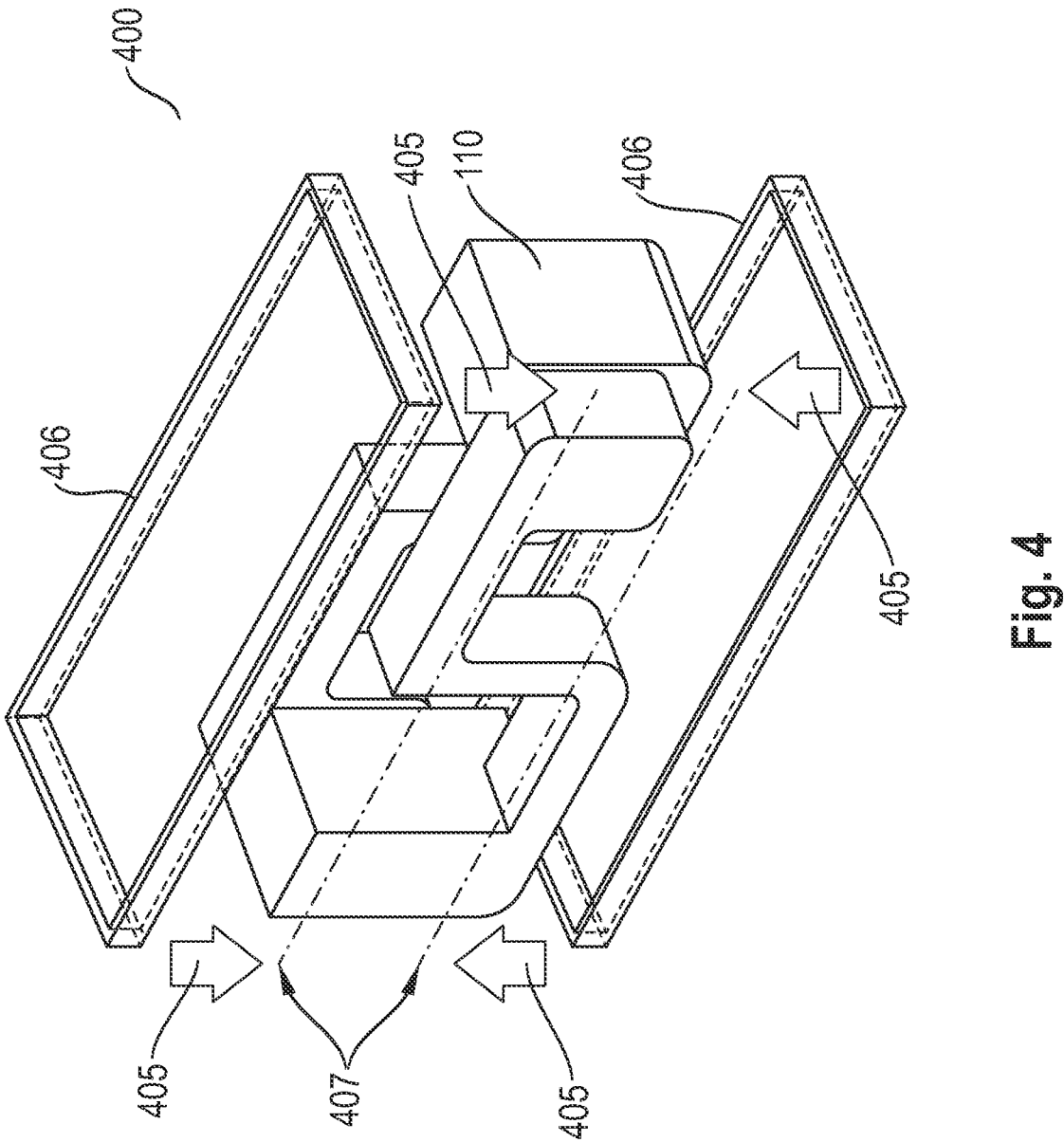
FIG. 4 shows a perspective view of a fixation of the clasps with the retaining frame in the configuration of the apparatus according to an embodiment of the invention.

FIG. 4 shows, in a perspective view 400, a fixation of the clasps with a retaining frame 406 in the configuration of the apparatus 110 according to an embodiment of the invention. In order to hold the two clasps forming the apparatus 110 to one another, a respective retaining frame 406 is pushed from top and bottom up to the respective fixation position 407 in the assembly direction 405. The respective fixation positions 407 are selected such that a retaining frame 406 pushed thereto is not impaired by an opening formed by the shaping of the clasps for receiving respective busbars or conductors.

Figure 5:
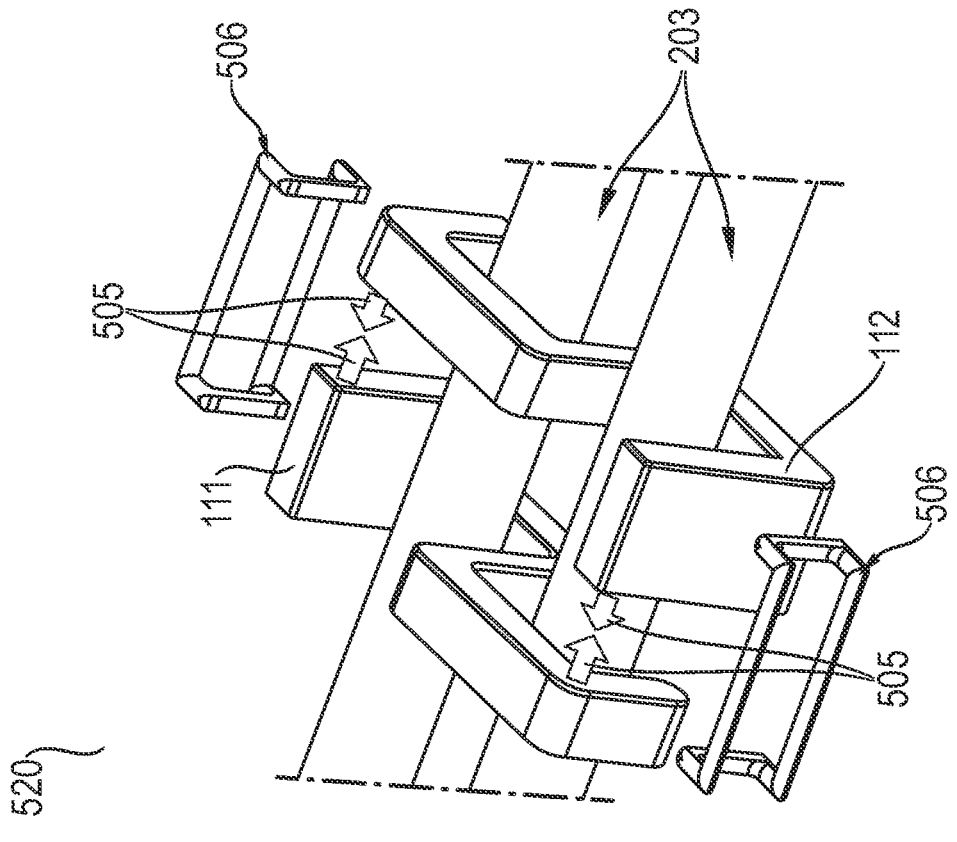
FIG. 5 shows a perspective view of fixed clasps with an associated assembly illustration in the configuration of the apparatus according to an embodiment of the invention.
Figure 5:
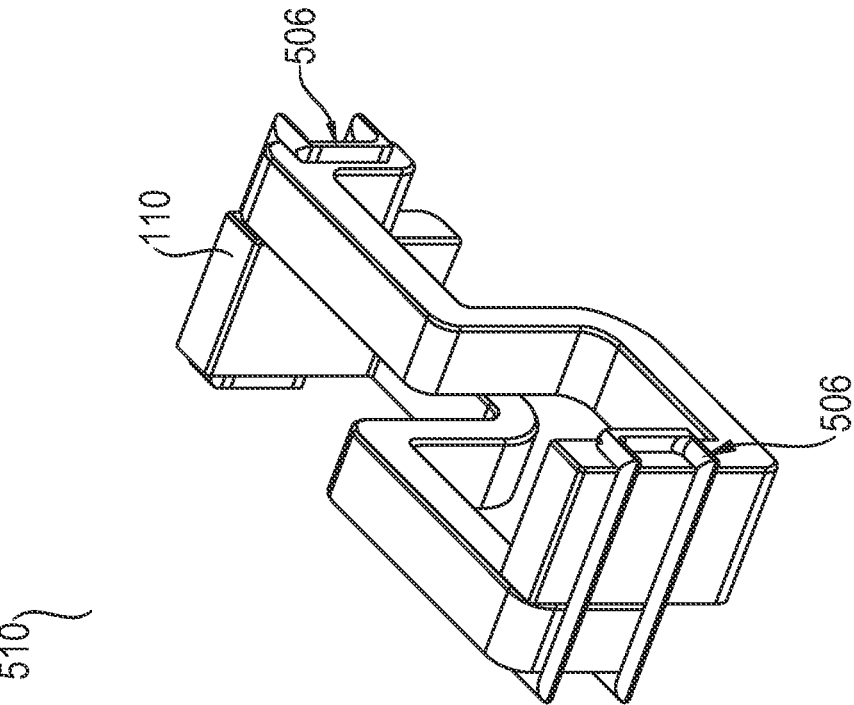

In FIG. 5, fixed clasps 510 with an associated assembly illustration 520 are shown in a perspective view in the configuration of the apparatus 110 according to embodiments of the invention. The two clasps 111, 112 of the apparatus 110 are fixedly connected to one another by fixation clamps 506 at their connecting regions. The assembly illustration 520 shows a connection of the two clasps 111, 112 in the assembly direction 505 after a respective clasp 111, 112 has been threaded between the two busbars 203, possibly fixedly connected to battery modules, which can also be two conductor cables, according to an embodiment of the invention. When assembled, the two clasps 111, 112 are fixedly connected using fixation clamps 506. Such a fixation clamp 506 is formed, for example, by a sheet metal bending part and has resilient properties.

Figure 6:
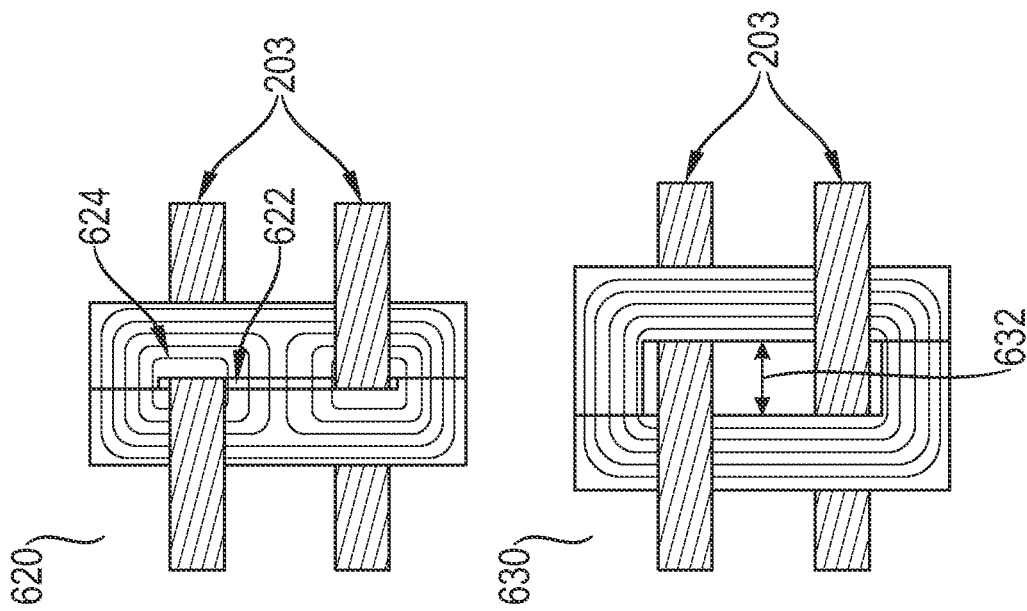
FIG. 6 shows an aerial view of respective guides of a magnetic flux in the configuration of the apparatus according to an embodiment of the invention.
Figure 6:
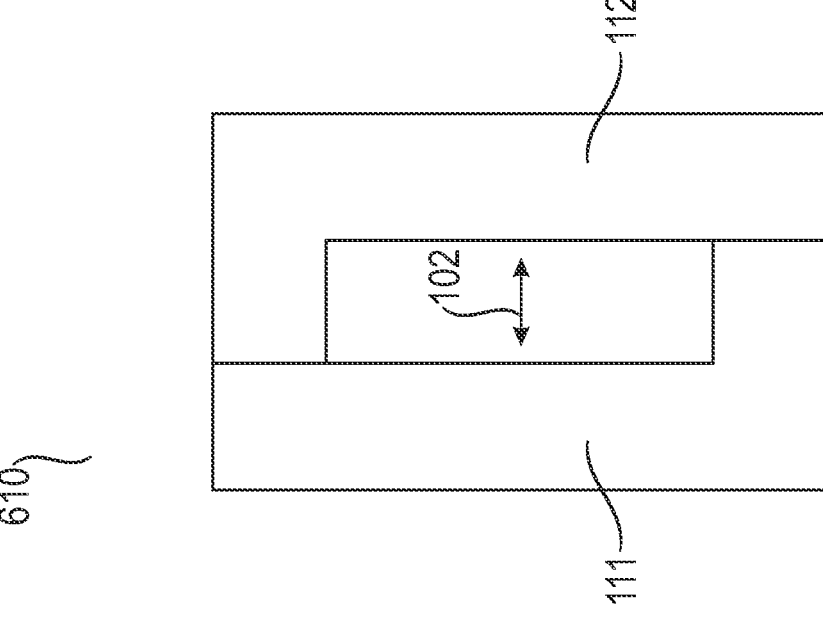

In FIG. 6, respective guides of a magnetic flux in the configuration of the apparatus 610, 630 according to an embodiment of the invention, as well as in a configuration of the apparatus 620 not according to the invention, are shown in an aerial view. In the aerial view of the configuration of the apparatus 610 according to an embodiment of the invention, the spacing 102 sufficiently provided in the center region of the two clasps 111, 112 is shown, which prevents a magnetic scattering flux, so that the magnetic flux is guided completely through the two clasp 111, 112 and does not take a "shortcut". As shown in the configuration of the apparatus 620 not according to the invention, if the two clasps were guided closer to one another and have only a narrow air gap 622, then paths of the magnetic flux curve 624 through the air could become energetically advantageous for a portion of the magnetic flux. However, this magnetic flux part would disadvantageously only flow around one of the two busbars 203 and thus would not establish an electromagnetic coupling between the two busbars 203. Only a center region sufficiently spaced apart by the spacing 632 of the respective clasps of the configuration of the apparatus 630 according to embodiments of the invention ensures advantageous guidance of the magnetic flux, which electromagnetically couples both busbars 203 and dampens these currents with opposing currents.

Figure 7:
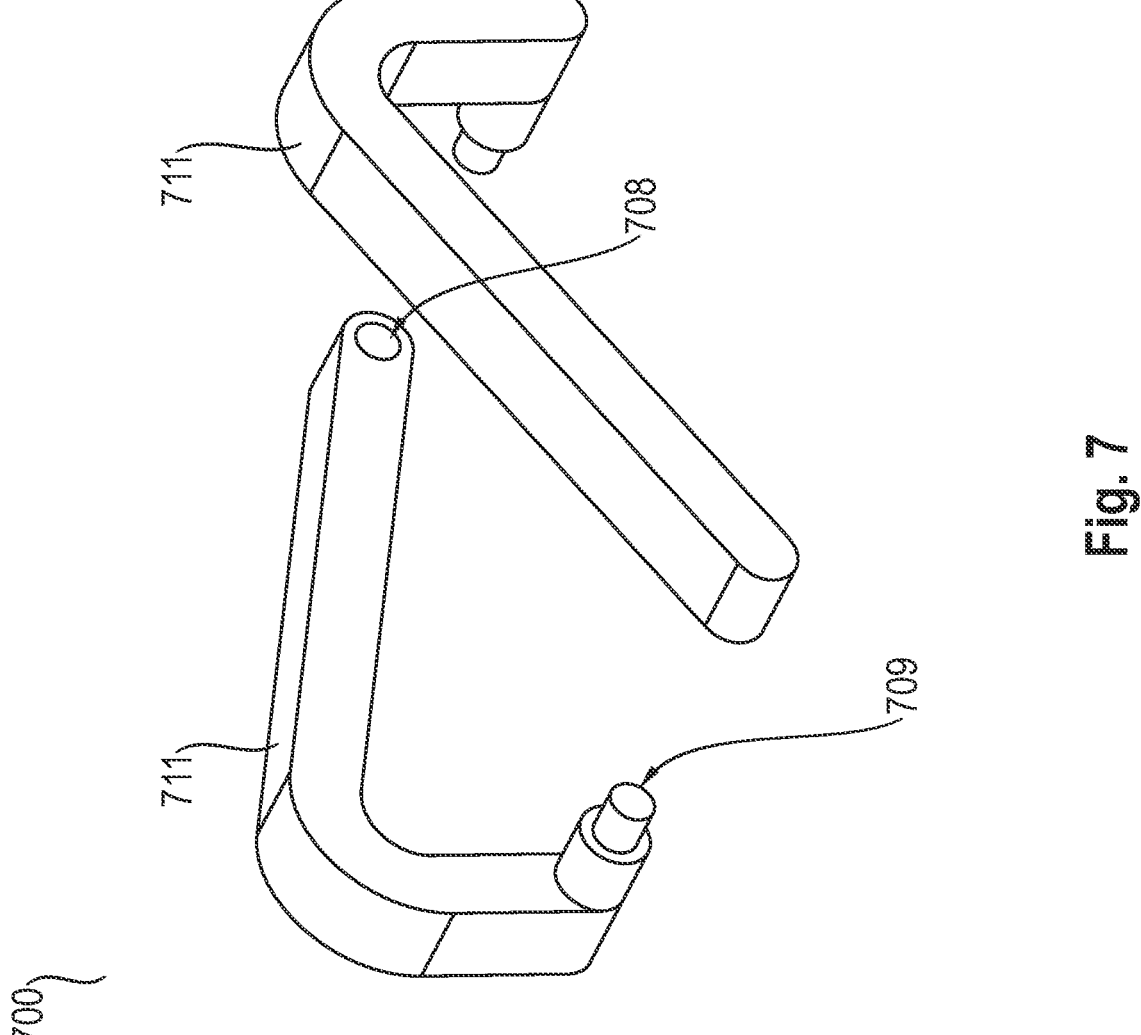
FIG. 7 shows a perspective view of a further configuration of the apparatus according to an embodiment of the invention.

In FIG. 7, a further configuration of the apparatus according to an embodiment of the invention is shown in a perspective view 700. Both clasps 711 of the other configuration are identical and shaped like the letter "J" and have a plug pin 709 at one end and a plug opening 708 at the other end. The clasps 711 of the differently designed apparatus are e.g. formed with a magnetic material, which is additionally sheathed in a plastic. A tolerance in the plastic of the sheath causes a locking of the plug connection.

Figure 8:
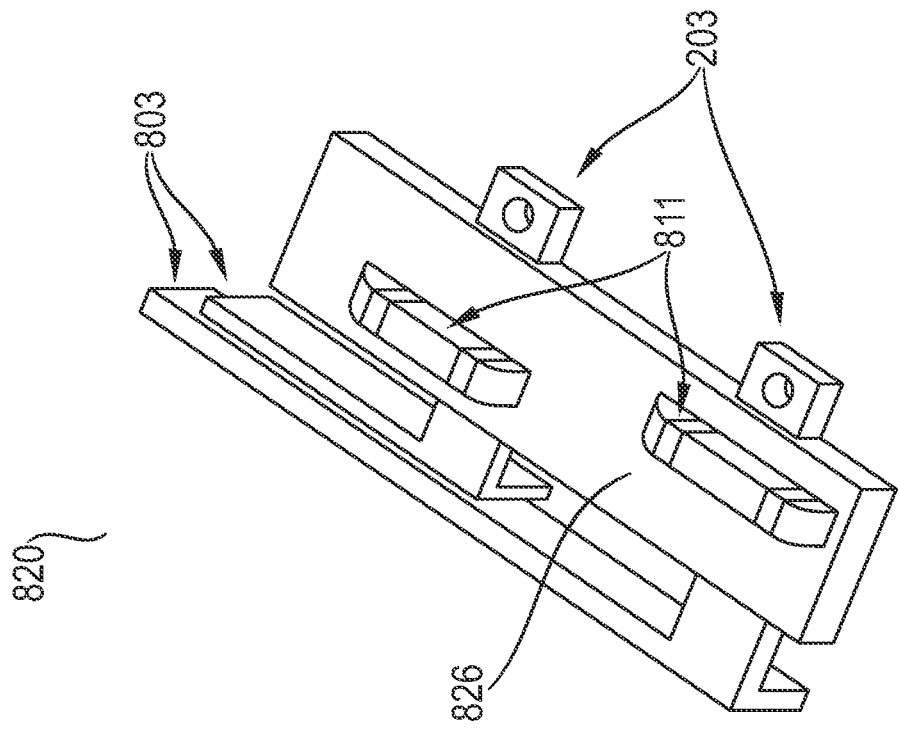
FIG. 8 shows a perspective view of plastic embeddings with integrated insulation and the fastening capability of the busbars in another configuration of the apparatus according to an embodiment of the invention.
Figure 8:
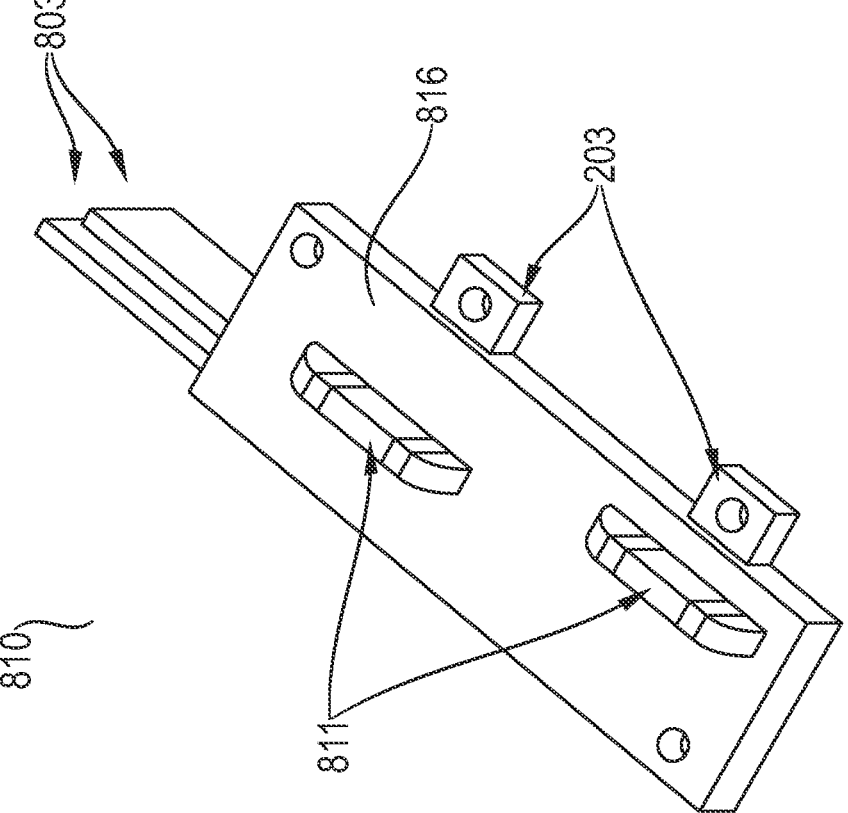

In FIG. 8, a first plastic embedding 816 and a second plastic embedding 826 of a further configuration of the apparatus according to an embodiment of the invention are shown in a perspective view 810, 820. Space-saving multi-layer busbars 803 are connected to the busbars 203 extending to the terminal on a battery module. In the view 810, both a region around the connection between the multi-layer busbars 803 and the busbar 203 and the apparatus arranged there on the busbar 203 are embedded in a plastic 816, e.g. by plastic injection molding. Projecting from the first plastic embedding 816, only a portion of the respective clasps 811 of the further configuration of the apparatus can be seen. In the view 820, the second plastic embedding of clasps 826 of the apparatus and busbars 203 according to an embodiment of the invention takes place even before connection to the multi-layer busbars 803. By embedding the clasps 811 and the busbar 203 in the view 820 as well as additionally a part of the multi-layer busbars 803 in the view 810 by means of the plastic injection molding, the enclosed components can advantageously be fixed. The embedding of the clasps, including plastic injection molding, is already conceivable in the production process for the multi-layer busbars.

Figure 9:
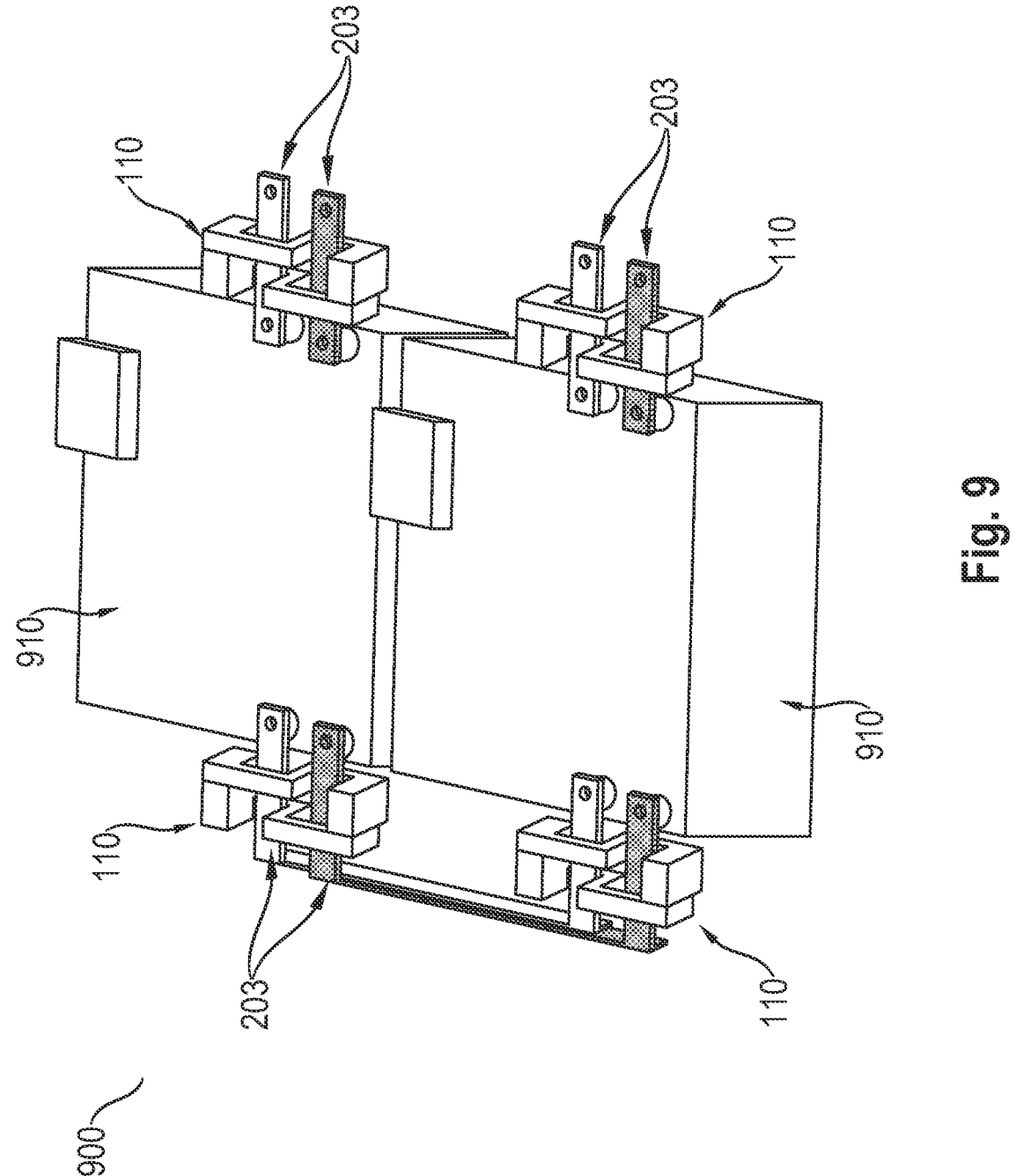
FIG. 9 shows a perspective view of an arrangement of the configuration of the apparatus according to an embodiment of the invention on battery modules of a reconfigurable battery.

In FIG. 9, an arrangement of the configuration of the apparatus 110 according to an embodiment of the invention is shown on two battery modules 910 of a reconfigurable battery in a perspective view 900. A respective battery module 910 comprises two terminals at which respective busbars 203 are fixedly connected. According to an embodiment of the present invention, the clasps of the apparatus 110 are threaded between the busbars 203 and connected to the apparatus 110, as shown in the figure. Advantageously, a disengagement of the busbars 203 from the respective terminals of the battery modules 910 is not necessary. It is conceivable to also stick the apparatus 110 on the busbars 203 with the clasps assembled prior to connecting the busbars 203 to the terminals of the battery modules 910.

Figure 10:
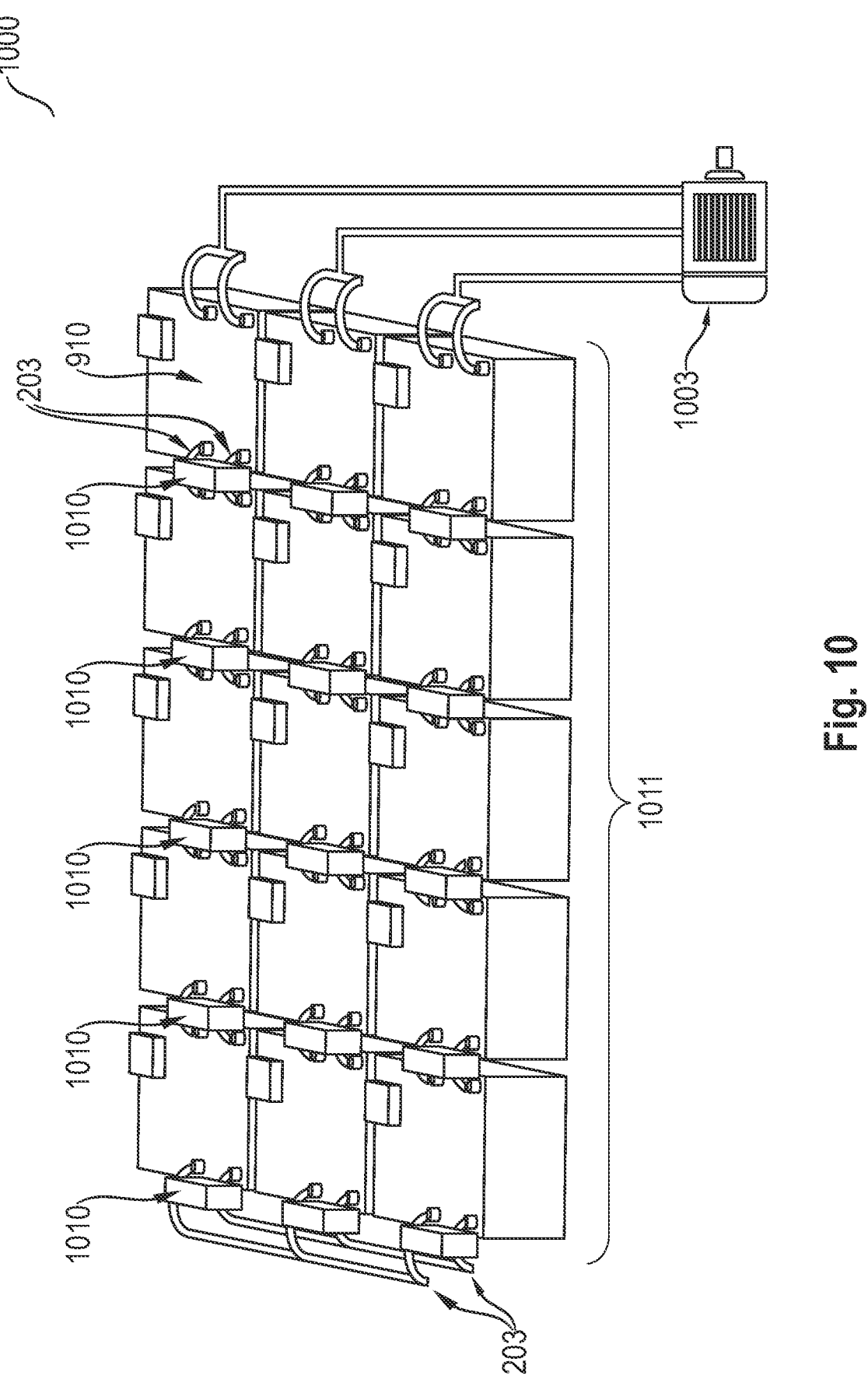
FIG. 10 shows a perspective view of an arrangement of another configuration of the apparatus according to an embodiment of the invention in a reconfigurable battery.

In FIG. 10, an arrangement of yet another configuration of the apparatus 1010 according to an embodiment of the invention in a reconfigurable battery 1011 is shown in a perspective view. According to an embodiment of the invention, the apparatus 1010 is arranged on the busbars 203 connected to the respective battery modules 910 and fixed, for example, by plastic injection molding. The reconfigurable battery 1011 is used as a traction battery for load supply to an electric machine 1003 as a traction machine, for example an electric vehicle.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS

100 Perspective view
101 Connection region
102 Spacing
110 Apparatus
111 First clasp
112 Second clasp
200 Perspective view of the apparatus on busbars
203 Busbars
300 Illustration of magnetic flux path
301 Contact surface
304 Magnetic flux path
305 Assembly direction
400 Fixation with retaining frame
405 Assembly direction
406 Retaining frame
407 Fixation position

505 Assembly direction
506 Fixation clamp
510 Fixed component
520 Assembly illustration
610 Aerial view of apparatus
620 Aerial view of apparatus with too small air gap
622 Too small air gap
624 Magnetic flux path
630 Aerial view of apparatus with sufficient air gap
632 Broad spacing with sufficient insulation
700 Perspective view of a further configuration of the apparatus
708 Plug opening
709 Plug pin
711 Further configuration of a clasp
803 Multi-layer busbars
810 Perspective view in first configuration with plastic embedding
811 Further configuration of a clasp
816 First plastic embedding
820 Perspective view in second configuration with plastic embedding
826 Second plastic embedding
900 Perspective view of an arrangement of the apparatus
910 Battery module
1000 Perspective view of a reconfigurable battery
1003 Traction motor
1010 Yet another configuration of the apparatus
1011 Reconfigurable battery

The invention claimed is:

1. An apparatus for magnetic flux generation on two parallel extending busbars, the apparatus comprising:

two clasps that are configured to be connected to one another, and which are formed from a magnetic material, wherein a respective clasp of the two clasps comprises at its two ends a respective connection region for contacting a respective other clasp of the two clasps, wherein the two clasps are configured such that, in a state where the two clasps are connected to one another, a central region of the respective clasp has a specified spacing from the central region of the respective other clasp, wherein the respective clasp is formed such that, in a condition where the respective clasp is inserted perpendicular to and between the parallel extending busbars, a first part of the respective clasp extends below one of the two busbars and a second part of the respective clasp extends above another of the two busbars, whereby the entirety of the apparatus is configured to enclose the two busbars in a direction of a busbar path in the form of an eight by the two clasps in a condition where the two clasps are connected to one another after a successful insertion, and wherein, perpendicular to the busbar path, the two clasps have the specified spacing relative to one another in a respective center part.

2. The apparatus according to claim 1, wherein the two clasps are configured to contact one another by a plug connection, so that the connection region of the respective clasp comprises a plug pin at its one end and a plug opening at its other end.

3. The apparatus according to claim 1, wherein the connection region of a respective clasp comprises at its one end a first contact surface and at its other end a second contact surface that is configured to be connected to the first contact surface in a form-fit manner.

4. The apparatus according to claim 3, wherein the two clasps are configured to be fixedly connected to one another by way of adhesion or by respective clamps around the respective connection regions or by at least one frame surrounding both of the two clasps.

5. The apparatus according to claim 1, wherein the two clasps are identically shaped and wherein the two clasps are configured to be connected to one another in a twisted manner relative to one another.

6. The apparatus according to claim 1, wherein each of the two clasps comprises an insulating upper layer outside the respective connection region.

7. The apparatus according to claim 1, wherein the respective clasp comprises two opposing bends in a shape of a letter "S" or the respective clasp only has one bend in the shape of a letter "J".

8. The apparatus according to claim 1, wherein the magnetic material of the two clasps is selected from a group of materials with high permeability counts according to the following list: ferrite, soft-magnetic composite, nanocrystalline ferromagnetic alloys, and laminated steel sheets.

9. A method of generating magnetic flux in a reconfigurable battery, the reconfigurable battery comprising multiple battery modules, a respective battery module comprises at least one electrical terminal, on which two busbars are brought up to one another while extending parallel to one another, the method comprising:

arranging, at one location of the two busbars, the apparatus according to claim 1, and in a case of a high current flowing in an opposite direction in the respective busbars, generating a magnetic flux dampening the current by the apparatus.

10. A reconfigurable battery having multiple battery modules, wherein at least one pair of busbars brought up to a respective terminal of a respective battery module comprises at a respective location the apparatus according to claim 1.

11. A system, the system comprising:

two parallel extending conductors; and an apparatus for magnetic flux generation on the conductors, the apparatus comprising:

two clasps that are connected to one another, and which are formed from a magnetic material, wherein a first clasp of the clasps comprises at its two ends a respective connection region for contacting a second clasp of the clasps, wherein a central region of the first clasp has a specified spacing from a central region of the second clasp, wherein the first clasp is perpendicular to and between the two conductors, a first part of the first clasp extends below a first conductor of the two conductors and a second part of the first clasp extends above a second conductor of the two conductors, whereby the entirety of the apparatus encloses the two conductors in a direction of a conductor path in the form of an eight by the clasps, and wherein, perpendicular to the conductor path, the clasps have the specified spacing relative to one another in the central region.

* * * * *